US008206000B2

(12) United States Patent
Tung et al.

(10) Patent No.: US 8,206,000 B2

(45) Date of Patent: Jun. 26, 2012

(54) HOLLOW EDGE-TYPE BACKLIGHT MODULE WITH LIGHT-EMITTING ARRAY

(75) Inventors: Chih-Kang Tung, Hsin-Chu (TW); Chih-Wei Chang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 271 days.

(21) Appl. No.: 12/577,297

(22) Filed: Oct. 12, 2009

(65) Prior Publication Data

US 2010/0246164 A1 Sep. 30, 2010

(30) Foreign Application Priority Data

Mar. 27, 2009 (TW) .............................. 98110184 A

(51) Int. Cl.
*G09F 13/08* (2006.01)

(52) U.S. Cl. ................. 362/97.1; 362/97.3; 362/249.02; 362/249.01; 362/241; 362/301; 362/237

(58) Field of Classification Search ........ 362/97.1–97.3, 362/249.02, 249.01, 237, 241, 296.01, 297, 362/300–301, 243, 245, 346, 349; 349/62, 349/64

See application file for complete search history.

(56) References Cited

U.S. PATENT DOCUMENTS

| | | | | |
|---|---|---|---|---|
| 4,271,408 | A | 6/1981 | Teshima et al. | |
| 4,929,866 | A * | 5/1990 | Murata et al. | 313/500 |
| 5,453,855 | A | 9/1995 | Nakamura et al. | |
| 6,793,361 | B2 | 9/2004 | Matsui | |
| 7,506,996 | B2 * | 3/2009 | Birman et al. | 362/236 |
| 7,513,634 | B2 * | 4/2009 | Chen | 362/97.1 |
| 7,600,908 | B2 * | 10/2009 | Chang et al. | 362/623 |
| 7,946,747 | B2 * | 5/2011 | Kim et al. | 362/628 |
| 2007/0147036 | A1 * | 6/2007 | Sakai et al. | 362/240 |

FOREIGN PATENT DOCUMENTS

| | | | |
|---|---|---|---|
| CN | 2434586 | Y | 6/2001 |
| CN | 1588207 | A | 3/2005 |

(Continued)

OTHER PUBLICATIONS

English language translation of abstract of CN 101071226A (Published Nov. 14, 2007).

(Continued)

*Primary Examiner* — Robert May

(74) *Attorney, Agent, or Firm* — Thomas, Kayden, Horstemeyer & Risley, LLP

(57) ABSTRACT

A hollow edge-type backlight module with a light-emitting array and a display apparatus containing the same are disclosed. The hollow edge-type backlight module mainly utilizes a hollow reflection structure to replace a light-guide plate structure, and forms a light-emitting unit by collaborating with an edge-type light source, and forms a light-emitting array by appending together a plurality of light-emitting units. The reflection structure of each light-emitting unit has a horizontal surface and a reflective surface connected to the horizontal surface, wherein there is an angle included between the reflective surface and a surface extended from the horizontal surface, and the light source is disposed adjacent to the horizontal surface. A diffuser of the hollow edge-type backlight module is disposed above the reflective surface and the horizontal surface, and the diffuser, the light source, the horizontal surface and the reflective surface define at least one air cavity.

10 Claims, 12 Drawing Sheets

FOREIGN PATENT DOCUMENTS

| | | | |
|---|---|---|---|
| CN | 101071226 | A | 11/2007 |
| JP | 2002-372933 | A | 12/2002 |
| TW | 2008-04922 | | 1/2008 |

OTHER PUBLICATIONS

English language translation of abstract of CN 2434586Y (Published Jun. 13, 2001).

English language translation of abstract of CN 1588207A (Published Mar. 2, 2005).

English language translation of abstract of TW 2008-04922 (published Jan. 16, 2008).

English language translation of abstract and pertinent parts of JP 2002372933 A.

* cited by examiner

HOLLOW EDGE-TYPE BACKLIGHT MODULE WITH LIGHT-EMITTING ARRAY

RELATED APPLICATIONS

This application claims priority to Taiwan Application Serial Number 98110184, filed Mar. 27, 2009, which is herein incorporated by reference.

BACKGROUND

1. Field of Invention

The present invention relates to a backlight module. More particularly, the present invention relates to a hollow edge-type backlight module with a light-emitting array.

2. Description of Related Art

A backlight module is one of the key components for a liquid crystal display (LCD) panel. Since liquid crystals themselves do not emit light, the backlight module is required for providing a light source, whereby the LCD panel can show a normal image of uniform brightness. In general, a backlight module has two type designs: a direct-type design and an edge-type design and the backlight module always comprises a backlight source such as a Cold Cathode Fluorescent Lamp (CCFL) and a light emitting diode (LED), etc.

With the advent of liquid crystal display (LCD) technologies, a local dimming control technology has played an important part in the LCD market, which may greatly promote the additional value of a LCD, and has become an emphasized item for LCD manufacturers. The local dimming control technology is to divide the backlight source of the LCD into a plurality of blocks, and then to control the brightness of each block in accordance with a display image. Broadly speaking, the local dimming control technology can be classified into three categories: 0D dimming control, 1D dimming control and 2D dimming control, wherein the 2D dimming control has the best effect. A conventional skill uses a direct-type LED backlight module to implement the 2D dimming control technology, which has the advantages of high dynamic contrast and energy saving. However, the direct-type LED backlight module is too thick, and thus the requirement of thin products cannot be met.

Another conventional skill overlaps a plurality of wedge light guide plates to obtain a structure of edge-type backlight module. Although this structure of edge-type backlight module can be applied to the local dimming control and has a relatively small thickness, yet its assembling steps are too complicated. Furthermore, its assembly variances will cause differences among respective blocks of the backlight module, so that it is quite difficult to actually overlap several light guide plates to obtain a backlight module of large size or special size.

SUMMARY

In view of the above, the conventional direct-type LED backlight module has too large thickness, and it is quite complicated to assemble the conventional edge-type backlight module by overlapping light guide plates. Hence, the present invention provides a hollow edge-type backlight module with a light-emitting array for implementing a local dimming control technology, thereby satisfying the product requirements of the lightness and thinness; and providing the feasibility of obtaining a backlight module of large size or special size by modulizing and appending together the light-emitting units.

In accordance with one embodiment, a hollow edge-type backlight module comprises a light-emitting array and a diffuser. The light-emitting array comprises a plurality of light-emitting units, wherein each of the light-emitting units has a reflection structure and at least one light source, and the reflection structure has a horizontal surface and a reflective surface connected to the horizontal surface, wherein there is a first angle between the reflective surface and a surface extended from the horizontal surface, and the light source is disposed adjacent to the horizontal surface. The diffuser is disposed above the light-emitting array, wherein the diffuser has a contact with the reflective surface and the horizontal surface, wherein the diffuser, the light source, the horizontal surface and the reflective surface define an air cavity. In another embodiment, the light source comprises at least one LED light source, and the first angle ranges substantially from 5 degrees to 45 degrees, and the area of the reflective surface satisfies the relationship, $1 \leqq (R \times \cos(A\mathbf{1}))/H \leqq 10$, wherein R represents the area of the reflective surface; A1 representing the first angle; H representing the area of the horizontal surface.

According to another embodiment, the hollow edge-type backlight module further comprises a back plate, and each of the light-emitting units comprises a support member and a reflecting plate. The support member is disposed on the back plate, and the support member has a slant surface facing towards the light source and the diffuser, and the reflecting plate is located on the slant surface of the support member to form the reflective surface of the reflection structure, wherein a surface of the back plate between the light source and the support member forms the horizontal surface of the reflection structure.

According to another embodiment, the hollow edge-type backlight module further comprises a back plate, and each of the light-emitting units comprises a support member. The support member is disposed on the back plate, and has a slant surface facing towards the light source and the diffuser; wherein the support member is formed from high reflective material, and the slant surface of the support member constructs the reflective surface of the reflection structure, and a surface of the back plate between the light source and the support member constructs the horizontal surface of the reflection structure.

According to another embodiment, each of the light-emitting units comprises a back plate. The back plate has a horizontal portion and a slant portion, wherein the horizontal portion constructs the horizontal surface of the reflection structure, and the slant portion constructs the reflective surface of the reflection structure. In another embodiment, a reflecting plate is further attached to the slant portion.

According to another embodiment, the reflection structure is composed of a reflecting plate, and the reflecting plate is formed on a light-entering side of the reflection structure, an surface and a slant portion of a back plate, and the light-entering side of the reflection structure has an opening for mounting the light source therein.

According to another embodiment, a hollow edge-type backlight module comprises a light-emitting array and a diffuser. The light-emitting array comprises a plurality of light-emitting units, and each of the light-emitting units has a first reflection structure, a second reflection structure, at least one first light source and at least one second light source. The first reflection structure has a first horizontal surface and a first reflective surface connected to the first horizontal surface, and there is a first angle between the first reflective surface and a surface extended from the first horizontal surface, and the first light source is disposed adjacent to the first horizontal surface. The second reflection structure has a second horizontal surface and a second reflective surface connected to the second horizontal surface, and there is a second angle between the second reflective surface and a surface extended from the second horizontal surface, and the second reflective surface is connected to the first reflective surface, and the second light source is disposed adjacent to the second horizontal surface. The diffuser is disposed above the light-emitting array, wherein the diffuser has contacts with the first reflective surface and the second reflective surface. In another embodiment, each of the first light source and the second light source comprises at least one LED light source, and each of the first angle and the second angle ranges substantially from 5 degrees to 45 degrees. The area of the first reflective surface or the second reflective surface satisfies the following relationship, $1 \leqq (R \times \cos(A1))/H \leqq 10$, wherein R represents the area of the first reflective surface or the second reflective surface; A1 representing the first angle or the second angle; H representing the area of the first horizontal surface or the first horizontal surface. In another embodiment, the first reflection structure and the second reflection structure are mutually mirror-reflected in shape.

According to another embodiment, the hollow edge-type backlight module further comprises a back plate, and each of the light-emitting units comprises a first support member, a first reflecting plate, a second support member and a second reflecting plate. The first support member is disposed on the back plate, and has a first slant surface facing towards the first light source and the diffuser. The first reflecting plate is attached to the first slant surface of the first support member for constructing the first reflective surface of the first reflection structure, and a surface of the back plate between the first light source and the first support member constructs the first horizontal surface of the first reflection structure. The second support member is disposed on the back plate, and has a second slant surface facing towards the second light source and the diffuser. The second reflecting plate is attached to the second slant surface of the second support member for constructing the second reflective surface of the second reflection structure, and a surface of the back plate between the second light source and the second support member constructs the second horizontal surface of the second reflection structure.

According to another embodiment, the hollow edge-type backlight module further comprises a back plate, and each of the light-emitting units comprises a first support member and a second support member. The first support member is disposed on the back plate, and has a first slant surface facing towards the first light source and the diffuser; wherein the first support member is formed from high reflective material, and the first slant surface of the first support member constructs the reflective surface of the first reflection structure, and a surface of the back plate between the first light source and the first support member constructs the first horizontal surface of the first reflection structure. The second support member is disposed on the back plate, and has a second slant surface facing towards the second light source and the diffuser; wherein the second support member is formed from high reflective material, and the second slant surface of the second support member constructs the reflective surface of the second reflection structure, and a surface of the back plate between the second light source and the second support member constructs the second horizontal surface of the second reflection structure.

According to another embodiment, each of the light-emitting units comprises a back plate. The back plate has a first horizontal portion, a first slant portion, a second horizontal portion and a second slant portion, wherein the first horizontal portion constructs the first horizontal surface of the first reflection structure, and the first slant portion constructs the first reflective surface of the first reflection structure, and the second horizontal portion constructs the second horizontal surface of the second reflection structure, and the second slant portion constructs the second reflective surface of the second reflection structure.

According to another embodiment, the first reflection structure is composed of a first reflecting plate, and the first reflecting plate is formed on a first light-entering side of the first reflection structure, an surface and a first slant portion of a first back plate, and the first light-entering side of the first reflection structure has an opening for mounting the first light source therein. The second reflection structure is composed of a second reflecting plate, and the second reflecting plate is formed on a second light-entering side of the second reflection structure, an surface and a second slant portion of a second back plate, and the second light-entering side of the second reflection structure has an opening for mounting the second light source therein.

According to another embodiment, a display apparatus comprises a display panel and a hollow edge-type backlight module with a light-emitting array described above. The display panel is disposed above the hollow edge-type backlight module.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
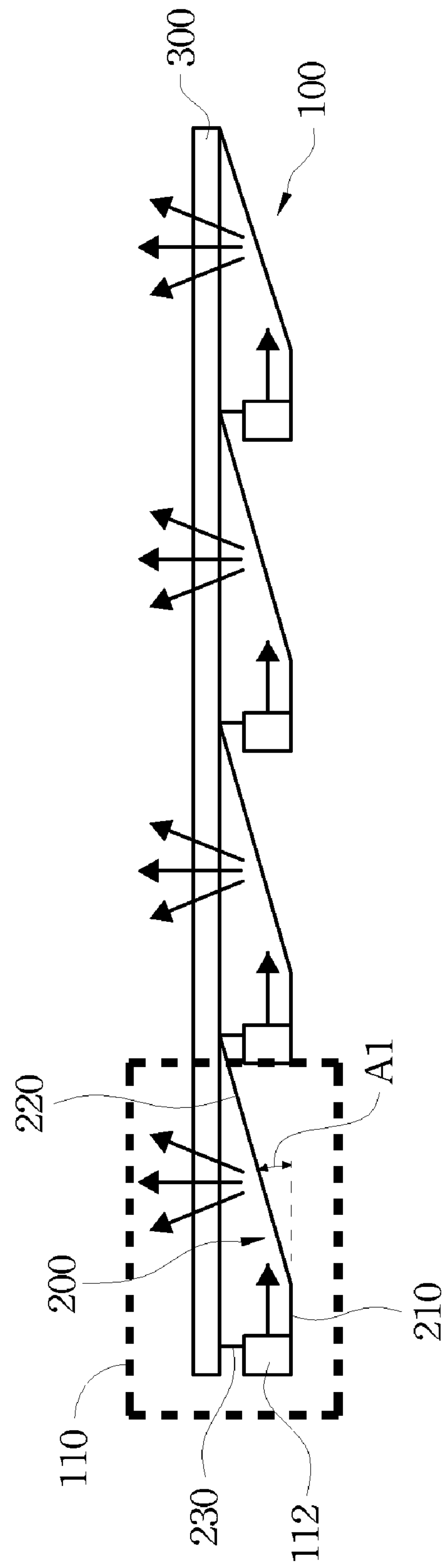
FIG. 1A is a schematic cross-sectional view showing a hollow edge-type backlight module with a light-emitting array in accordance with one embodiment.

Reference will now be made in detail to the present preferred embodiments of the invention, examples of which are illustrated in the accompanying drawings. Wherever possible, the same reference numbers are used in the drawings and the description to refer to the same or like parts.

The backlight module of the present invention mainly utilizes a hollow reflection structure to replace a conventional light guide plate, and forms a light-emitting unit by collaborating with an edge-type light source, forms a light-emitting array by appending together a plurality of light-emitting units, thereby greatly simplifying the assembling steps and achieving the object of local dimming control and light and thin products.

Figure 1B:
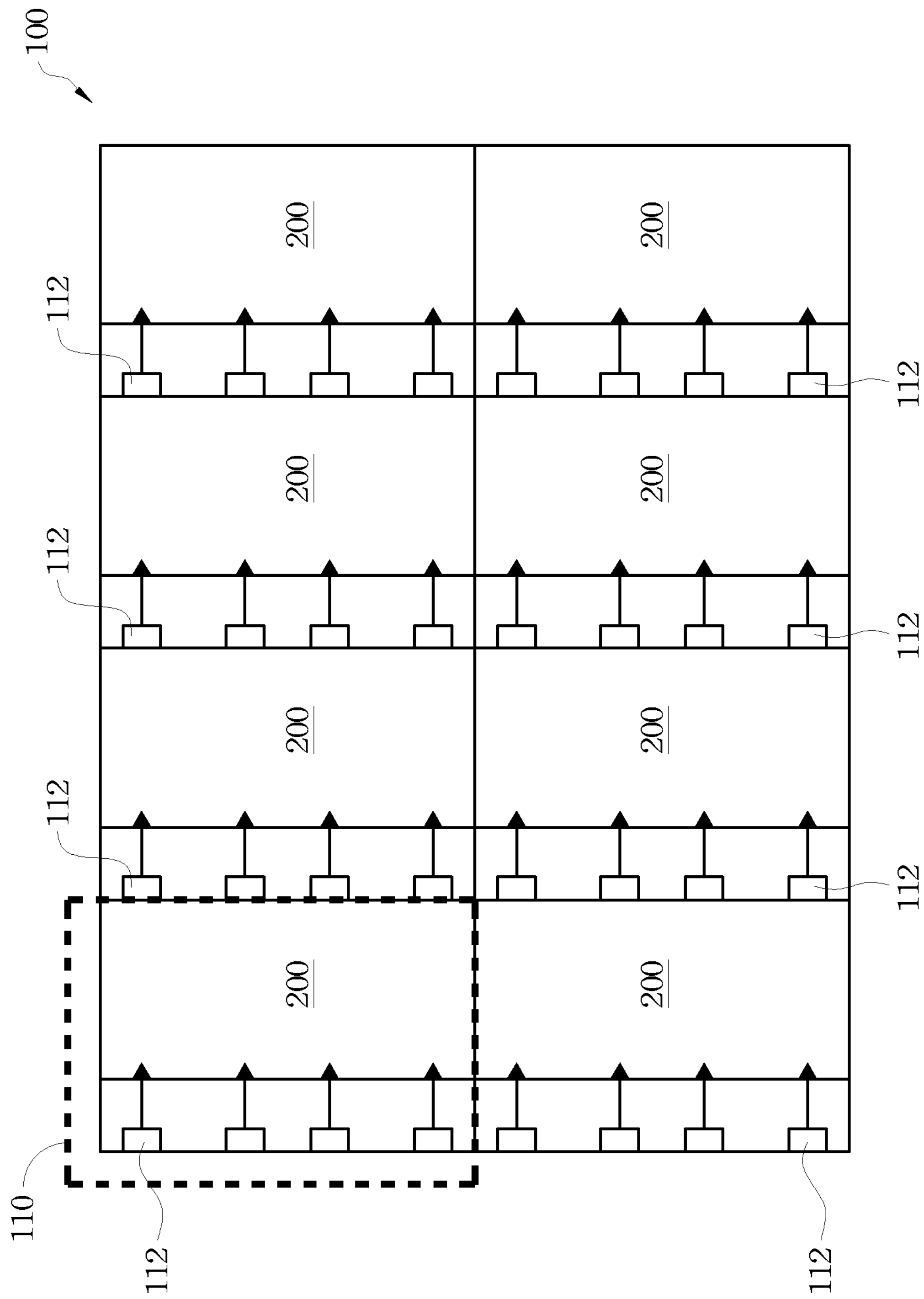
FIG. 1B is a schematic top view showing the light-emitting array in accordance with the embodiment.

Referring to FIG. 1A and FIG. 1B, FIG. 1A and FIG. 1B are schematic cross-sectional and top views respectively showing a hollow edge-type backlight module and a light-emitting array in accordance with one embodiment. In this embodiment, a hollow edge-type backlight module comprises a light-emitting array 100 and a diffuser 300. The light-emitting array 100 comprises a plurality of light-emitting units 110, wherein each of the light-emitting units 110 has a reflection structure 200 and at least one light source 112. The reflection structure 200 has a horizontal surface 210 and a reflective surface 220 connected to the horizontal surface 210. In this embodiment, the reflective surface 220 and the horizontal surface 210 are planar surfaces, and there is an angle A1 between the reflective surface 220 and a surface extended from the horizontal surface 210, wherein the angle A1 ranges substantially from 5 degrees to 45 degrees, and the area of the reflective surface 220 satisfies the following relationship:

$$1 \leqq (R \times \cos(A1))/H \leqq 10 \quad (1)$$

wherein R represents the area of the reflective surface 220; H representing the area of the horizontal surface 210. The diffuser 300 is disposed above a light-emitting direction of the light-emitting array 100 and has a contact with the reflective surface 220, wherein the diffuser 300, the light source 112, the horizontal surface 210 and the reflective surface 220 define an air cavity (not labeled). The light source 112 is disposed adjacent to the horizontal surface 210, and a light-entering side 230 at which the light source 112 is mounted can be any structure as long as the light emitted from the light source 112 may enter the air cavity and be reflected to the diffuser 300, such as the reflection structure 200 having an opening in the side surface thereof; or a support member which has an opening and is independent of the reflection structure 200. The light source 112 can be such as a LED light source, and the light source 112 of each light-emitting unit 110 may further be electrically connected to a printed circuit board (not shown) or a flexible printed circuit board (not shown) so as to form a LED light bar. Since the area near the LED light source has stronger light intensity, a portion of the reflection structure 200 near the LED light source has to be designed to lowering its reflected light amount, thereby avoiding the occurrence of bright spots; and the reflection structure 200 away from the LED light source has to be in a gradually changing profile so as to generate a uniform light field. Further, the reflective surface 220 of this embodiment is not limited to a planar surface. For example, the reflective surface 220 also can be designed to a curved surface in accordance with various LED light patterns.

As shown in FIG. 1A, the backlight module of the present invention is formed by appending together a plurality of light-emitting units 110. A light-emitting unit 110 provides light for a display sub-zone, and is based on the requirement of lightness and the size of the display sub-zone to determine the number and pitch of the LED light source, thereby achieving high uniformity for each display sub-zone. Hence, it is relatively simpler to implement this embodiment than to directly design a large-size backlight module, and in theory, the structures of the present invention may be appended together for manufacturing a backlight module of an arbitrary size.

Hereinafter, the methods for manufacturing the reflection structures of various embodiments are explained.

Embodiment 1

Figure 2A:
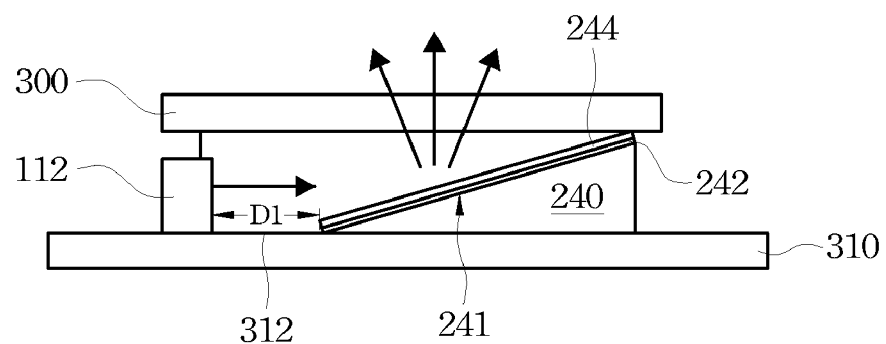
FIG. 2A is a schematic cross-sectional view showing a reflection structure in accordance with one embodiment.

Referring to FIGS. 1A and 2A, FIG. 2A is a schematic cross-sectional view showing a reflection structure in accordance with one embodiment. In this embodiment, the hollow edge-type backlight module comprises a back plate 310, and the reflection structure 200 of each light-emitting unit 110 (as shown in FIG. 1A) is formed by a support member 240 and a reflective plate 244, wherein the reflective plate 244 is formed from high reflective material, and the support member 240 is made of plastic or metal material. The support member 240 is disposed on the back plate 310, and has a slant surface 241 facing towards the light source 112 and the diffuser 300. The reflecting plate 244 is attached to the slant surface 241 of the support member 240 via an adhesive element 242, thereby constructing the reflective surface 220 of the reflection structure 200. The support member 240 is spaced from the light source 112 at a distance D1, and a surface 312 of the back plate 300 therebetween constructs the horizontal surface 210 of the reflection structure 200. The reflective plate 244 may be extended to the surface 312 of the back plate 300 between the light source 112 and the support member 240. Alternatively, another reflective plate of which the reflectivity is different from that of the reflective plate 244 may be attached to the surface 312 of the back plate 300. Although this embodiment uses the adhesive element 242 to attach the reflective plate 244 to the slant surface 241 of the support member 240, yet the present invention is not limited thereto. For example, a reflective layer with a high reflectivity may be directly coated or evaporated-coated on a slant surface of the support member 240, thereby constructing the reflective surface 220 of the reflection structure 200.

Figure 2B:
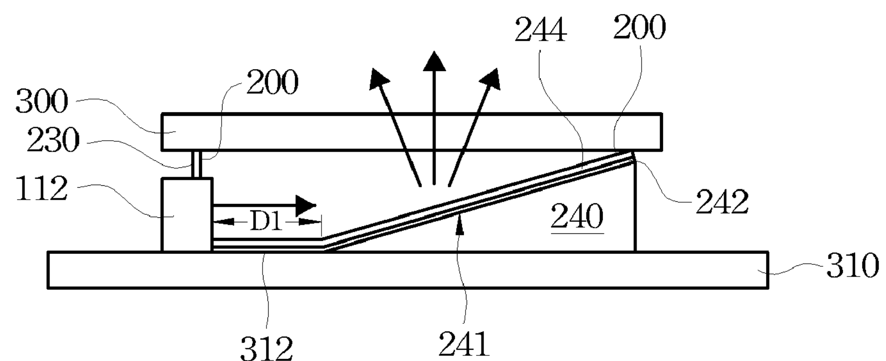
FIG. 2B is a schematic cross-sectional view showing a monolithically-formed reflection structure in accordance with another embodiment.

Further, referring to FIG. 2B, FIG. 2B is a schematic cross-sectional view showing a monolithically-formed reflection structure in accordance with another embodiment. As shown in FIG. 2B, the reflection structure 200 is composed of the reflecting plate 244, and the reflecting plate 244 is disposed on the light-entering side 230 of the reflection structure 200, the surface 312 of the back plate 310 and the support member 240. One side (the light-entering side 230) of the reflection structure 200 has an opening (not shown), and the light source 112 is mounted in the opening, thereby allowing the light emitted from the light source 112 to enter the air cavity and then to be reflected to the diffuser 300 by the reflecting plate 244.

Embodiment 2

Figure 2C:
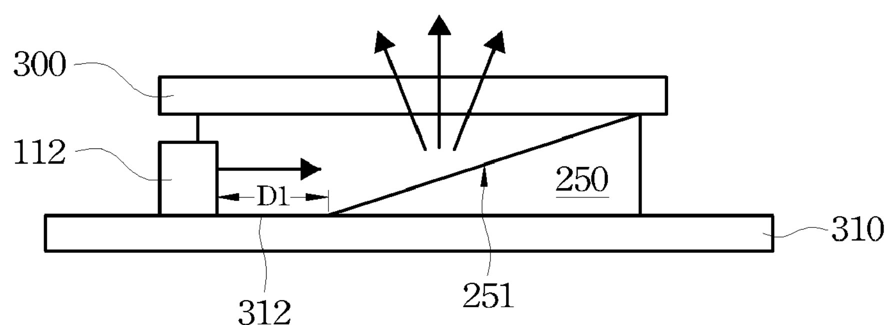
FIG. 2C is a schematic cross-sectional view showing a reflection structure in accordance with another embodiment.

Referring to FIGS. 1A and 2C, FIG. 2C is a schematic cross-sectional view showing a reflection structure in accordance with another embodiment. In this embodiment, the reflection structure 200 of each light-emitting unit 110 (as shown in FIG. 1A) is formed by a support member 250, wherein the support member 250 is disposed on the back plate 310, and has a slant surface 251 facing towards the light source 112 and the diffuser 300, and the support member 250 is spaced from the light source 112 at a distance D1. In comparison with the first embodiment, the support member 250 of this embodiment is formed from high reflective material, and thus the slant surface 251 of the support member 250 can be used to form the reflective surface 220 of the reflection structure 200, and the surface 312 of the back plate 310 between the light source 112 and the support member 250 can be used to form the horizontal surface 210 of the reflection structure 200, without needing a reflecting plate attached to the slant surface 251 of the support member 250. In this embodiment, the support member 250 can be directly formed by, for example, an injection forming process.

Embodiment 3

Figure 2D:
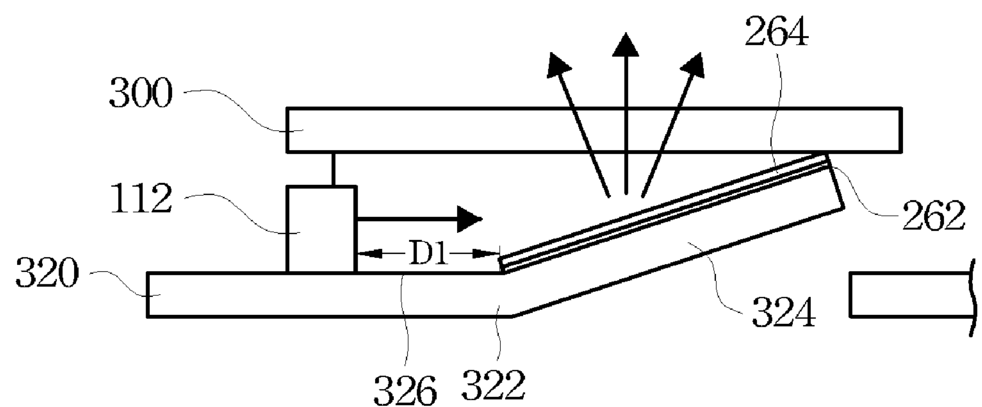
FIG. 2D is a schematic cross-sectional view showing a reflection structure in accordance with another embodiment.

Referring to FIGS. 1A and 2D, FIG. 2D is a schematic cross-sectional view showing a reflection structure in accordance with another embodiment. In this embodiment, the reflection structure 200 of each light-emitting unit 110 (as shown in FIG. 1A) is formed by a back plate 320, wherein the back plate 320 has a horizontal portion 322 and a slant portion 324. The light source 112 is spaced from the slant portion 324 at a distance D1, and a surface 326 of the horizontal portion 322 constructs the horizontal surface 210 of the reflection structure 200, and the slant portion 324 constructs the reflective surface 220 of the reflection structure 200. This embodiment uses an adhesive element 262 to attach a reflective plate 264 (high reflective material) to the surface of the slant portion 324 of the back plate 320, thereby constructing the reflective surface 220 of the reflection structure 200, wherein the reflective plate 264 may be extended to the surface 326 of the back plate 320. Alternatively, another reflective plate of which the reflectivity is different from that of the reflective plate 264 may be attached to the surface 326 of the back plate 320. However, the present invention is not limited thereto. For example, the back plate 320 can be directly made of high reflective material, or a reflective layer with a high reflectivity can be directly coated or evaporated on the surface of the slant portion 324 of the back plate 320, thereby constructing the reflective surface 220 of the reflection structure 200.

Figure 2E:
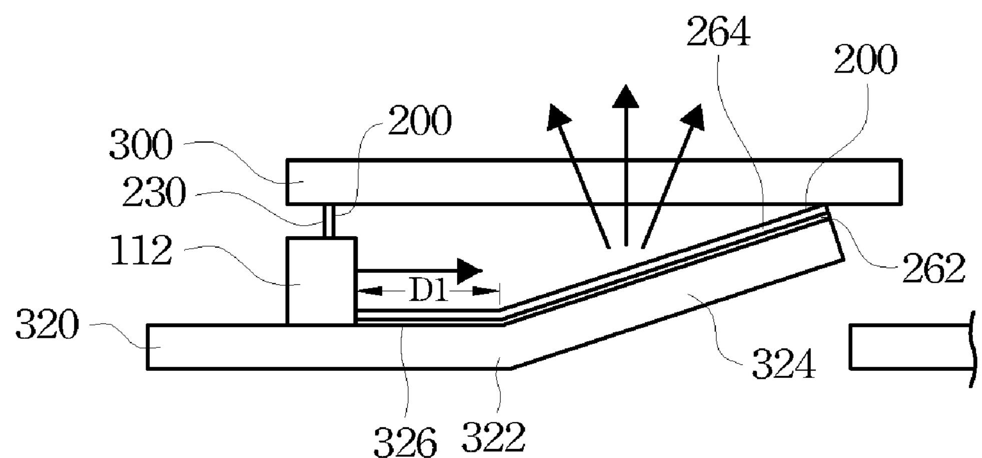
FIG. 2E is a schematic cross-sectional view showing a monolithically-formed reflection structure in accordance with another embodiment.

Further, referring to FIG. 2E, FIG. 2E is a schematic cross-sectional view showing a monolithically-formed reflection structure in accordance with another embodiment. As shown in FIG. 2E, the reflection structure 200 is composed of the reflecting plate 264, and the reflecting plate 264 is disposed on the light-entering side 230 of the reflection structure 200, and the slant portion 324 and the surface 326 of the back plate 320. One side (the light-entering side 230) of the reflection structure 200 has an opening (not shown), and the light source 112 is mounted in the opening, thereby allowing the light emitted from the light source 112 to enter the air cavity and then to be reflected to the diffuser 300 by the reflecting plate 264.

In sum, there are several methods for manufacturing the reflection structure 200 of the present invention. As shown in FIG. 2A, the reflection structure 200 can be formed by fixing the support member 240 on the back plate 310, and then attaching the reflecting plate 244 to the slant surface 241 of the support member 240. As shown in FIG. 2B, the reflection structure 200 shown in FIG. 1A can be composed of the reflecting plate 244. A shown in FIG. 2C, the reflection structure 200 can be formed by directly injection forming the support member 250 having a reflecting function using high reflective material. As shown in FIG. 2D, the reflection structure 200 can be formed by punching and folding the back plate 320 to form the slant portion 324 for supporting the reflecting plate 264, as long as the angle and position of the reflecting plate 264 can be effectively fixed thereby. As shown in FIG. 2E, the reflection structure 200 shown in FIG. 2D can be composed of the reflecting plate 264. The designs of the aforementioned support members 240 and 250 and back plate 320 can be simplified to form a plurality of elongated units so as to form the light-emitting rows (columns) of the light-emitting array 100 shown in FIG. 1B, which can be interconnected via the areas outside a viewable area, thereby greatly simplifying the assembling steps and reducing assembly variances, thus flexibly manufacturing a backlight module of large size or special size by appending tighter the light-emitting units.

The layout of the light source of the present invention is not limited to the reflection structure having only one light-entering side, and is also applicable to the reflection structure having such as two light-entering sides or four light-entering edges, as long as the layout of the light source matches with the type of reflection structure properly.

Figure 3A:
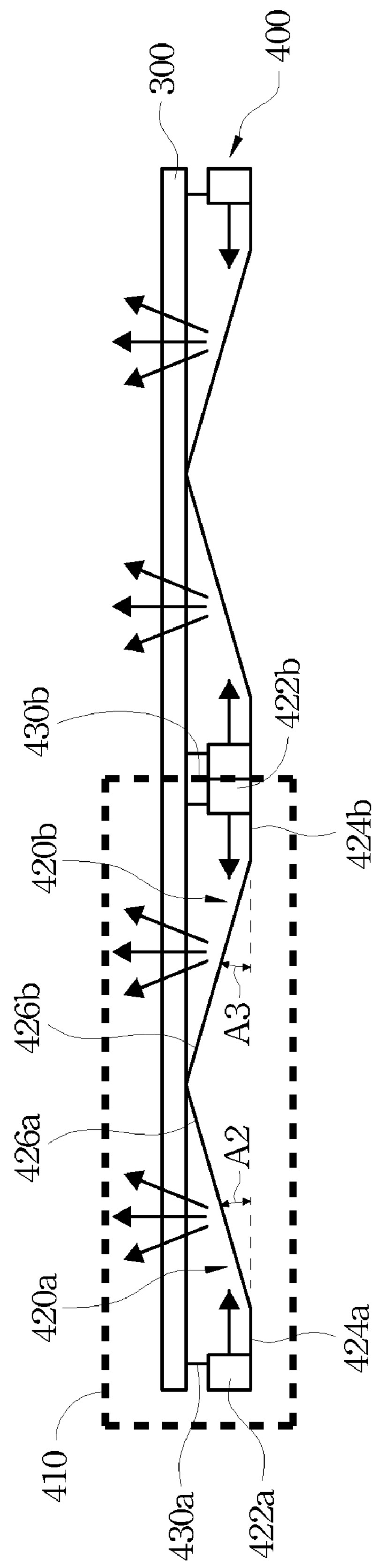
FIG. 3A is a schematic cross-sectional view showing a hollow edge-type backlight module with a light-emitting array in accordance with another embodiment.
Figure 3B:
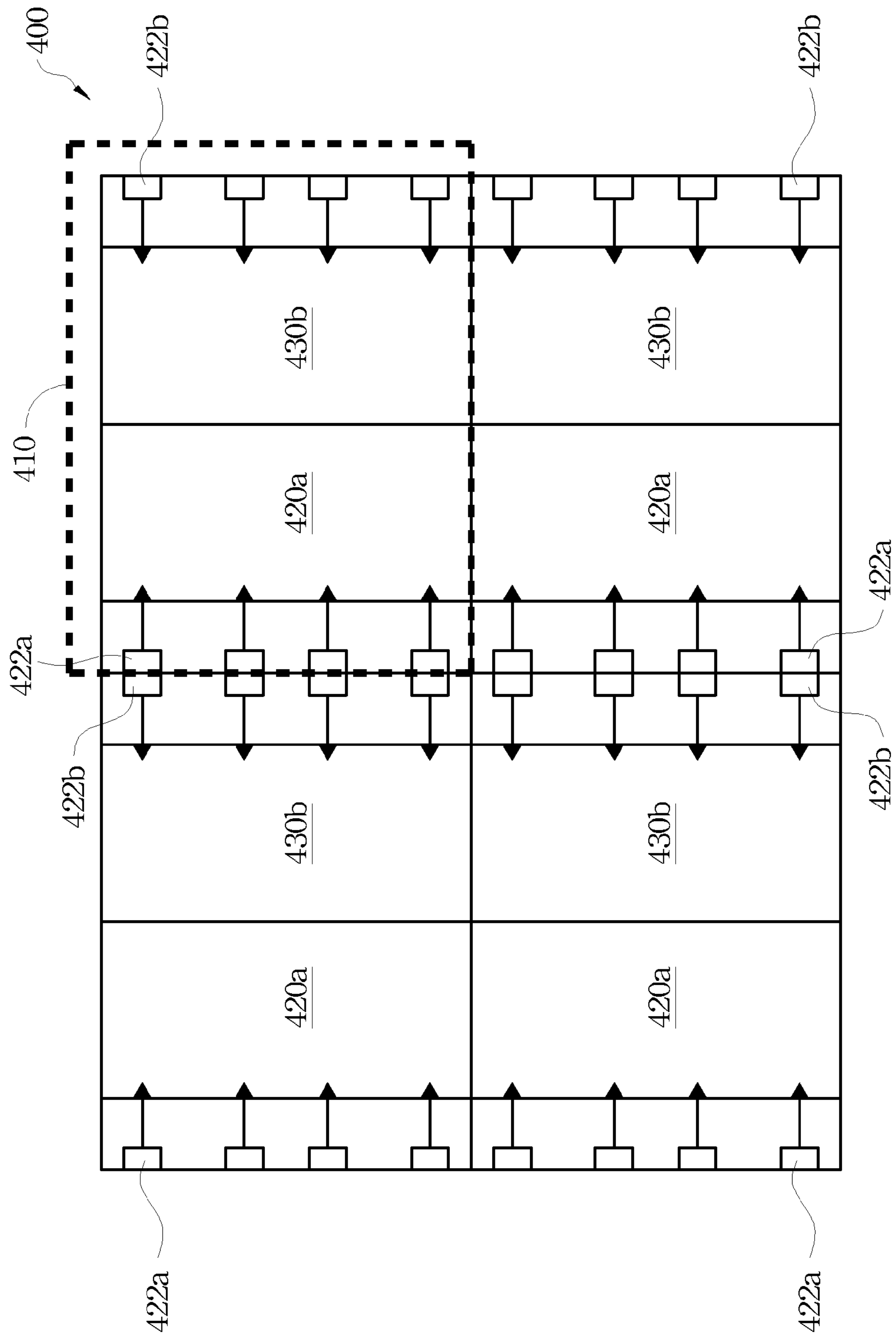
FIG. 3B is a schematic top view showing the hollow edge-type backlight module with a light-emitting array in accordance with another embodiment.

Referring to FIG. 3A and FIG. 3B, FIG. 3A and FIG. 3B are schematic cross-sectional and top views respectively showing a hollow edge-type backlight module and a light-emitting array in accordance with another embodiment. In this embodiment, a hollow edge-type backlight module comprises a light-emitting array 400 and a diffuser 300. The light-emitting array 400 comprises a plurality of light-emitting units 410, and each of the light-emitting units 410 has a symmetric reflection structure into which light is transmitted from the light sources disposed at both sides of the reflection structure. Each of the light-emitting units 410 has a first reflection structure 420*a*, a second reflection structure 420*b*, at least one first light source 422*a* and at least one second light source 422*b*, wherein the first reflection structure 420*a* and the second reflection structure 420*b* are mutually mirror-reflected in shape, and can be monolithically-formed structures, for example. The first light source 422*a* and the second light source 422*b* can be such as LED light sources.

The first reflection structure 420*a* has a first horizontal surface 424*a* and a first reflective surface 426*a* connected to the first horizontal surface 424*a*. There is an angle A2 between the first reflective surface 426*a* and a surface extended from the first horizontal surface 424*a*, and the first light source 422*a* is disposed adjacent to the first horizontal surface 424*a*, and a light-entering side 430*a* at which the first light source 422*a* is mounted can be such as the first reflection structure 420*a* having an opening in the side surface thereof; or a support member which has an opening and is independent of the first reflection structure 420*a*. The second reflection structure 420*b* has a second horizontal surface 424*b* and a second reflective surface 426*b* connected to the second horizontal surface 424*b*. There is an angle A3 between the second reflective surface 426*b* and a surface extended from the second horizontal surface 424*b*, and the second light source 422*b* is disposed adjacent to the second horizontal surface 424*b*, and a light-entering side 430*b* at which the second light source 422*b* is mounted can be such as the second reflection structure 420*b* having an opening in the side surface thereof; or a support member which has an opening and is independent of the second reflection structure 420*b*. The angle A2 ranges substantially from 5 degrees to 45 degrees, and the area of the first reflective surface 426*a* satisfies the following relationship:

$$1 \leqq (R1 \times \cos(A2))/H1 \leqq 10 \qquad (2)$$

wherein R1 represents the area of the first reflective surface 426*a*; H1 representing the area of the first horizontal surface 424*a*. The angle A3 ranges substantially from 5 degrees to 45 degrees, and the area of the second reflective surface 426*b* satisfies the following relationship:

$$1 \leqq (R2 \times \cos(A3))/H2 \leqq 10 \quad (3)$$

wherein R2 represents the area of the second reflective surface 426*b*; H2 representing the area of the second horizontal surface 424*b*.

The diffuser 300 is disposed above the second reflective surface 426*b*, the second horizontal surface 424*b*, the first reflective surface 426*a* and the first horizontal surface 424*a*, wherein the diffuser 300, the first light source 422*a*, the first horizontal surface 424*a* and the first reflective surface 426*a* define a first air cavity (not labeled); and the diffuser 300, the second light source 422*b*, the second horizontal surface 424*b* and the second reflective surface 426*b* define a second air cavity (not labeled).

The reflection structure of this embodiment is composed of the first reflection structure 420*a* and the second reflection structure 420*b*, and the first reflection structure 420*a* and the second reflection structure 420*b* are mutually mirror-reflected in shape. Hereinafter, the methods for manufacturing the first reflections structure 420*a* and the second reflection structure 420*b* are explained.

Embodiment 4

Figure 4A:
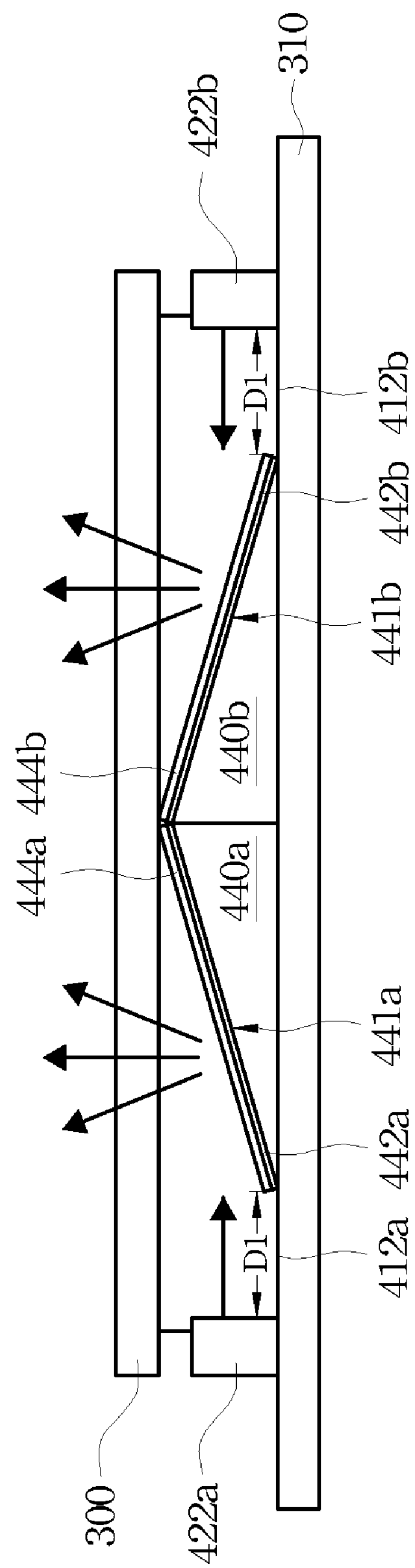
FIG. 4A is a schematic cross-sectional view showing a reflection structure in accordance with another embodiment.

Referring to FIGS. 3A and 4A, FIG. 4A is a schematic cross-sectional view showing a reflection structure in accordance with one embodiment. In this embodiment, the method for manufacturing the reflection structure 200 shown in FIG. 2A is used to manufacture the first reflections structure 420*a* and the second reflection structure 420*b* respectively, and the hollow edge-type backlight module comprises a back plate 310, wherein the first reflection structure 420*a* is formed by a first support member 440*a* and a first reflective plate 444*a*; and the second reflection structure 420*b* is formed by a second support member 440*b* and a second reflective plate 444*b*. The first support member 440*a* is disposed on the back plate 310, and has a slant surface 441*a* facing towards the first light source 422*a* and the diffuser 300. The second support member 440*b* is disposed on the back plate 310, and has a slant surface 441*b* facing towards the second light source 422*b* and the diffuser 300. The first reflecting plate 444*a* is attached to the slant surface 441*a* of the first support member 440*a* via a first adhesive element 442*a* for constructing the first reflective surface 426*a* of the first reflection structure 420*a*, and the second reflecting plate 444*b* is attached to the slant surface 441*b* of the second support member 440*b* via a second adhesive element 442*b* for constructing the second reflective surface 426*b* of the second reflection structure 420*b*. The first support member 440*a* is spaced from the first light source 422*a* at a distance D1, and a surface 412*a* of the back plate 310 therebetween constructs the first horizontal surface 424*a* of the first reflection structure 420*a*. The second support member 440*b* is spaced from the second light source 422*b* at a distance D1, and a surface 412*b* of the back plate 310 therebetween constructs the second horizontal surface 424*b* of the second reflection structure 420*b*.

Figure 4B:
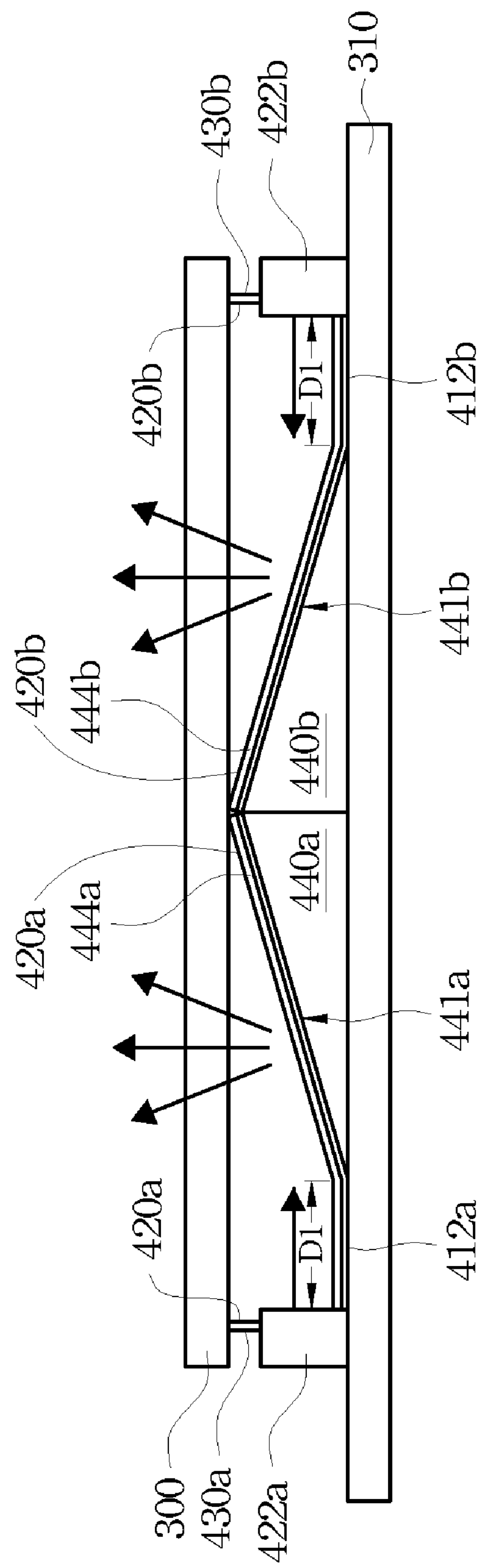
FIG. 4B is a schematic cross-sectional view showing a monolithically-formed reflection structure in accordance with another embodiment.

Further, referring to FIG. 4B, FIG. 4B is a schematic cross-sectional view showing a monolithically-formed reflection structure in accordance with another embodiment. The first reflection structure 420*a* is composed of the first reflecting plate 444*a*, and the first reflecting plate 444*a* is disposed on the first light-entering side 430*a* of the first reflection structure 420*a*, the surface 412*a* of the back plate 310 and the first support member 440*a*. The second reflection structure 420*b* is composed of the second reflecting plate 444*b*, and the second reflecting plate 444*b* is disposed on the second light-entering side 430*b* of the second reflection structure 420*b*, the surface 412*b* of the back plate 310 and the second support member 440*b*. One side (the first light-entering side 430*a*) of the first reflection structure 420*a* has an opening (not shown), and the first light source 422*a* is mounted in the opening, thereby allowing the light emitted from the first light source 422*a* to enter the air cavity and then to be reflected to the diffuser 300 by the first reflecting plate 444*a*. Another side (the second light-entering side 430*b*) of the second reflection structure 420*b* has an opening (not shown), and the second light source 422*b* is mounted in the opening, thereby allowing the light emitted from the second light source 422*b* to enter the air cavity and then to be reflected to the diffuser 300 by the second reflecting plate 444*b*.

Embodiment 5

Figure 4C:
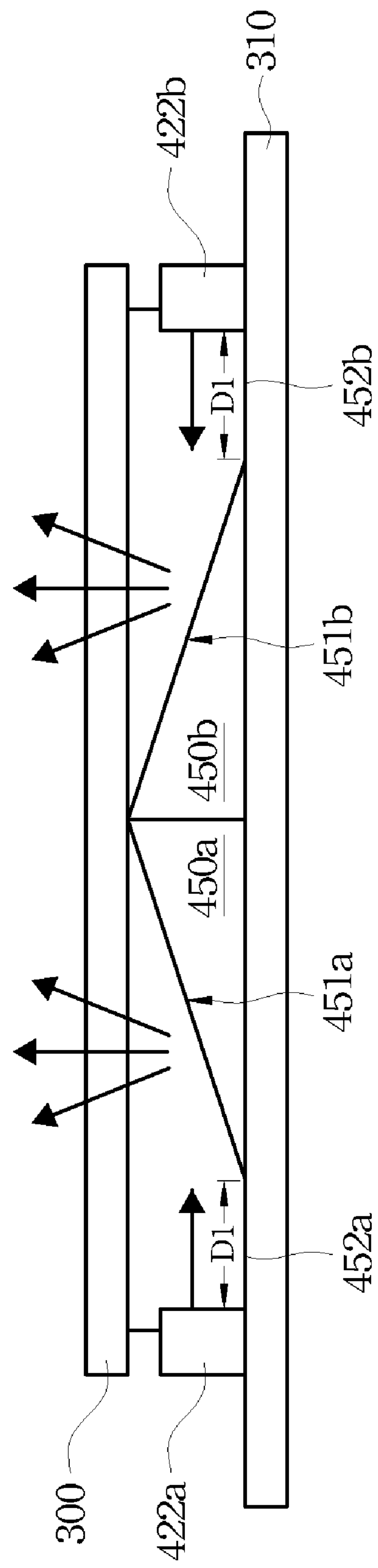
FIG. 4C is a schematic cross-sectional view showing a reflection structure in accordance with another embodiment.

Referring to FIGS. 3A and 4C, FIG. 4C is a schematic cross-sectional view showing a reflection structure in accordance with another embodiment. In this embodiment, the method for manufacturing the reflection structure 200 shown in FIG. 2C is used to manufacture the first reflections structure 420*a* and the second reflection structure 420*b* respectively. The first reflection structure 420*a* of this embodiment is formed by a first support member 450*a*, wherein the first support member 450*a* is disposed on the back plate 310, and has a first slant surface 451*a* facing towards the first light source 422*a* and the diffuser 300, and the first support member 450*a* is spaced from the first light source 422*a* at a distance D1. The second reflection structure 420*b* of this embodiment is formed by a second support member 450*b*, wherein the second support member 450*b* is disposed on the back plate 310, and has a second slant surface 451*b* facing towards the second light source 422*b* and the diffuser 300, and the second support member 450*b* is spaced from the second light source 422*b* at a distance D1. In comparison with the fourth embodiment, the first support member 450*a* and the second support member 450*b* of this embodiment are formed from high reflective material, and thus the first slant surface 451*a* and the second slant surface 451*b* can be used to form the first reflective surface 426*a* of the first reflection structure 420*a* and the second reflective surface 426*b* of the second reflection structure 420*b* respectively; and a surface 452*a* of the back plate 310 between the first light source 422*a* and the first support member 450*a* can be used to form the first horizontal surface 412*a* of the first reflection structure 420*a*; and a surface 452*b* of the back plate 310 between the second light source 422*b* and the second support member 450*b* can be used to form the second horizontal surface 412*b* of the second reflection structure 420*b*, so that this embodiment does not need to attach reflecting plates to the first slant surface 451*a* and the second slant surface 451*b*. In this embodiment, the first support member 450*a* and the second support member 450*b* can be directly formed by, for example, an injection forming process, wherein the first support member 450*a* and the second support member 450*b* are preferably monolithically integrated.

Embodiment 6

Figure 4D:
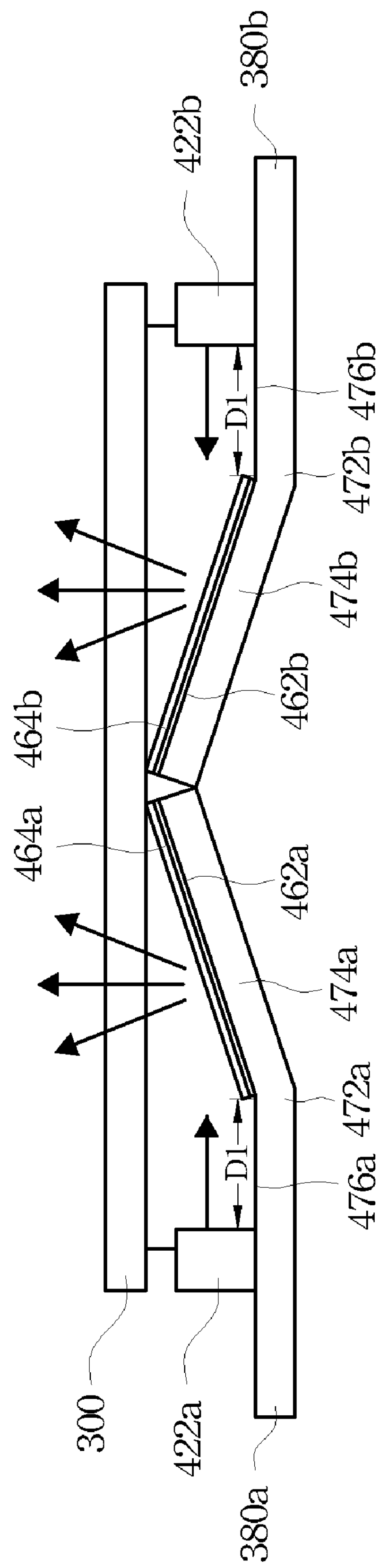
FIG. 4D is a schematic cross-sectional view showing a reflection structure in accordance with another embodiment.

Referring to FIGS. 3A and 4D, FIG. 4D is a schematic cross-sectional view showing a reflection structure in accordance with another embodiment. In this embodiment, the method for manufacturing the reflection structure 200 shown in FIG. 2D is used to manufacture the first reflections structure 420*a* and the second reflection structure 420*b* respectively. The first reflection structure 420*a* and the second reflection structure 420*b* are formed respectively by a first back plate 380*a* and a second back plate 380*b*. The first back plate 380*a* has a first horizontal portion 472*a* and a first slant portion 474*a*, and the first light source 422*a* is spaced from the first slant portion 474*a* at a distance D1, and a surface 476*a* of the first horizontal portion 472*a* constructs the first horizontal surface 424*a* of the first reflection structure 420*a*, and the first slant portion 474*a* constructs the first reflective surface 426*a* of the first reflection structure 420*a*. The second back plate 380*b* has a second horizontal portion 472*b* and a second slant portion 474*b*, and the second light source 422*b* is spaced from the second slant portion 474*b* at a distance D1, and a surface 476*b* of the second horizontal portion 472*b* constructs the second horizontal surface 424*b* of the second reflection structure 420*b*, and the second slant portion 474*b* constructs the second reflective surface 426*b* of the second reflection structure 420*b*. The first back plate 380*a* and the second back plate 380*b* are preferably monolithically integrated.

This embodiment uses a first adhesive element 462*a* to attach a first reflective plate 464*a* to the surface of the first slant portion 424*a* of the first back plate 380*a*, thereby constructing the first reflective surface 426*a* of the first reflection structure 420*a*, wherein the first reflective plate 464*a* may be extended to the surface 476*a* of the first back plate 380*a*; and uses a second adhesive element 462*b* to attach a second reflective plate 464*b* to the surface of the second slant portion 424*b* of the second back plate 380*b*, thereby constructing the second reflective surface 426*b* of the second reflection structure 420*b*, wherein the second reflective plate 464*b* may be extended to the surface 476*b* of the second back plate 380*b*.

Figure 4E:
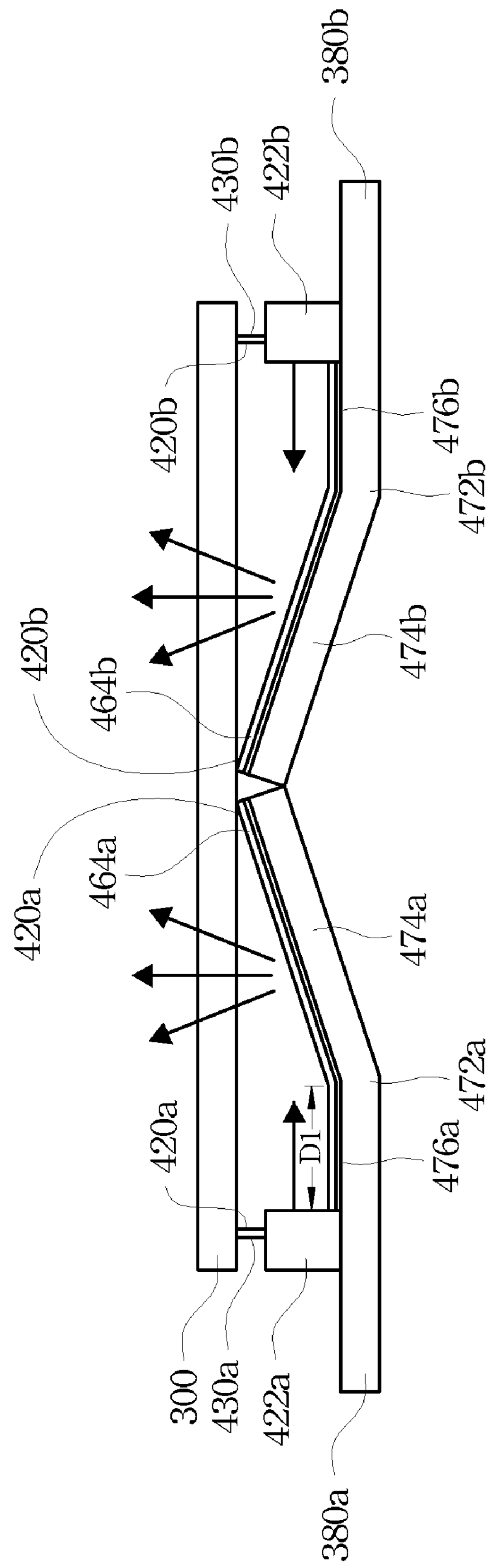
FIG. 4E is a schematic cross-sectional view showing a monolithically-formed reflection structure in accordance with another embodiment.

Further, referring to FIG. 4E, FIG. 4E is a schematic cross-sectional view showing a monolithically-formed reflection structure in accordance with another embodiment. The first reflection structure 420*a* is composed of the first reflecting plate 464*a*, and the first reflecting plate 464*a* is disposed on the first light-entering side 430*a* of the first reflection structure 420*a*, and the first slant portion 424*a* and the surface 476*a* of the first back plate 380*a*. The second reflection structure 420*b* is composed of the second reflecting plate 464*b*, and the second reflecting plate 464*b* is disposed on the second light-entering side 430*b* of the second reflection structure 420*b*, and the second slant portion 424*b* and the surface 476*b* of the second back plate 380*b*. The first reflection structure 420*a* and the second reflection structure 420*b* are preferably monolithically integrated. One side (the first light-entering side 430*a*) of the first reflection structure 420*a* has an opening (not shown), and the first light source 422*a* is mounted in the opening, thereby allowing the light emitted from the first light source 422*a* to enter the air cavity and then to be reflected to the diffuser 300 by the first reflecting plate 464*a*. Another side (the second light-entering side 430*b*) of the second reflection structure 420*b* has an opening (not shown), and the second light source 422*b* is mounted in the opening, thereby allowing the light emitted from the second light source 422*b* to enter the air cavity and then to be reflected to the diffuser 300 by the second reflecting plate 464*b*.

Figure 5:
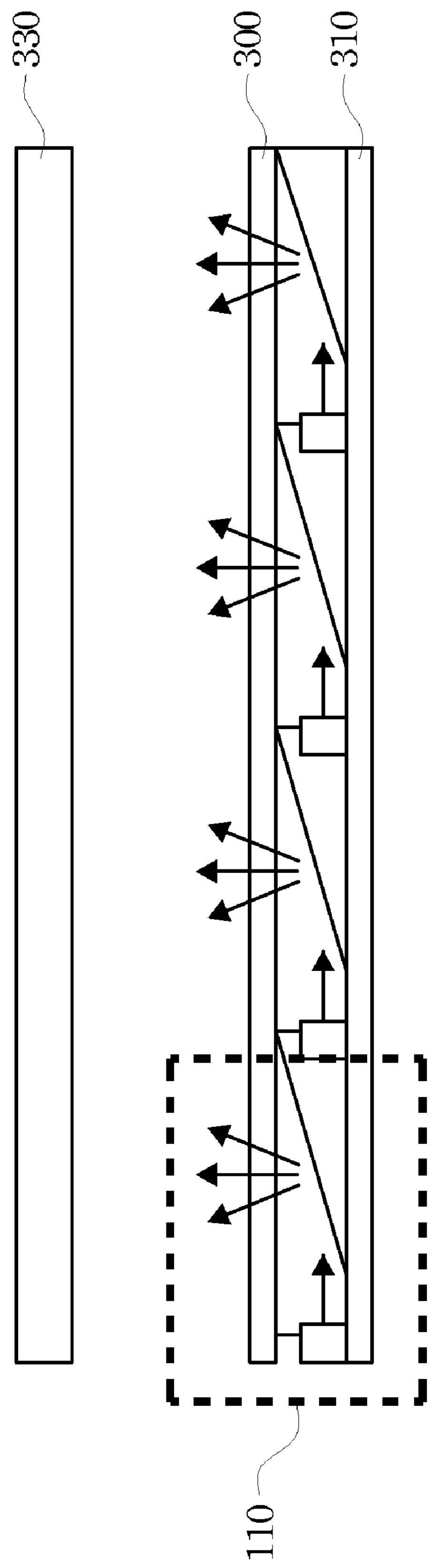
FIG. 5 is a schematic diagram showing a display apparatus in accordance with one embodiment of the present invention.

Referring to FIG. 5, FIG. 5 is a schematic diagram showing a display apparatus in accordance with one embodiment of the present invention. A display apparatus of this embodiment comprises any of the aforementioned hollow edge-type backlight modules (herein, the structure shown in FIG. 2B is used as a representation), and a display panel 330, wherein the display panel 330 is disposed above the hollow edge-type backlight module.

It can be known from the above embodiments that the present invention has the advantages of: collaborating a hollow reflection structure with an edge-type light source to save the weight of light guide plate for satisfying the requirements of the products of lightness and thinness; effectively implementing a local dimming control; and modulizing and appending together the light-emitting units to simplify the design and assembling steps, and to provide convenience for maintenance and the feasibility of obtaining a backlight module of large size or special size.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hollow edge-type backlight module, comprising:

a light-emitting array comprising a plurality of light-emitting units arranged in rows and columns, wherein each of the light-emitting units has a first reflection structure, a second reflection structure, at least one first light source and at least one second light source, wherein the first reflection structure and the second reflection structure are mutually mirror-reflected in shape; wherein the first reflection structure has a first horizontal surface and a first reflective surface connected to the first horizontal surface, and there is a first angle between the first reflective surface and a surface extended from the first horizontal surface, and the first light source is disposed adjacent to the first horizontal surface; and the second reflection structure has a second horizontal surface and a second reflective surface connected to the second horizontal surface, and there is a second angle included between the second reflective surface and a surface extended from the second horizontal surface, and the second reflective surface is connected to the first reflective surface, and the second light source is disposed adjacent to the second horizontal surface, wherein the first reflective surface, the second reflective surface and extensions of the first horizontal surface and the second horizontal surface form a space, and the space has a triangular cross-section; and a diffuser disposed above the light-emitting array, wherein the diffuser has contacts with the first reflective surface and the second reflective surface, and the diffuser, the first light source, the first horizontal surface and the first reflective surface define a first air cavity, and the diffuser, the second light source, the second horizontal surface and the second reflective surface define a second air cavity, and the space is located between the first air cavity and the second air cavity.

2. The hollow edge-type backlight module as claimed in claim 1, wherein each of the first reflection structure and the second reflection structure is a monolithically integrated structure.

3. The hollow edge-type backlight module as claimed in claim 1, further comprising a back plate, wherein each of the light-emitting units comprises:

a first support member disposed on the back plate, wherein the first support member has a first slant surface facing towards the first light source and the diffuser;

a first reflecting plate attached to the first slant surface of the first support member for constructing the first reflective surface of the first reflection structure, wherein a surface of the back plate between the first light source and the first support member constructs the first horizontal surface of the first reflection structure;

a second support member disposed on the back plate, wherein the second support member has a second slant surface facing towards the second light source and the diffuser; and a second reflecting plate attached to the second slant surface of the second support member for constructing the second reflective surface of the second reflection structure, wherein a surface of the back plate between the second light source and the second support member constructs the second horizontal surface of the second reflection structure.

4. The hollow edge-type backlight module as claimed in claim 1, further comprising a back plate, wherein each of the light-emitting units comprises:

a first support member disposed on the back plate, wherein the first support member has a first slant surface facing towards the first light source and the diffuser; wherein the first support member is formed from high reflective material, and the first slant surface of the first support member constructs the reflective surface of the first reflection structure, and a surface of the back plate between the first light source and the first support member constructs the first horizontal surface of the first reflection structure; and a second support member disposed on the back plate, wherein the second support member has a second slant surface facing towards the second light source and the diffuser; wherein the second support member is formed from high reflective material, and the second slant surface of the second support member constructs the reflective surface of the second reflection structure, and a surface of the back plate between the second light source and the second support member constructs the second horizontal surface of the second reflection structure.

5. The hollow edge-type backlight module as claimed in claim 1, wherein each of the light-emitting units comprises:

a back plate having a first horizontal portion, a first slant portion, a second horizontal portion and a second slant portion, wherein the first horizontal portion constructs the first horizontal surface of the first reflection structure, and the first slant portion forms the first reflective surface of the first reflection structure, and the second horizontal portion constructs the second horizontal surface of the second reflection structure, and the second slant portion constructs the second reflective surface of the second reflection structure.

6. The hollow edge-type backlight module as claimed in claim 1, wherein each of the first light source and the second light source comprises at least one LED light source.

7. The hollow edge-type backlight module as claimed in claim 1, wherein at least one of the first angle and the second angle ranges substantially from 5 degrees to 45 degrees.

8. The hollow edge-type backlight module as claimed in claim 1, wherein the area of the first reflective surface satisfies the following relationship:

$$1 \leqq (R \times \cos(A2))/H \leqq 10;$$

wherein R represents the area of the first reflective surface; A2 representing the first angle; H representing the area of the first horizontal surface.

9. The hollow edge-type backlight module as claimed in claim 1, wherein the area of the second reflective surface satisfies the following relationship:

$$1 \leqq (R \times \cos(A3))/H \leqq 10;$$

wherein R represents the area of the second reflective surface; A3representing the second angle; H representing the area of the second horizontal surface.

10. The hollow edge-type backlight module as claimed in claim 1, wherein the first reflection structure is composed of a first reflecting plate, and the first reflection structure has a first opening in the side surface for mounting the first light source therein, and the second reflection structure is composed of a second reflecting plate, and the second reflection structure has a second opening in the side surface for mounting the second light source therein.

* * * * *